United States Patent

[11] 3,627,149

| [72] | Inventor | Gerhard Arnemann<br>Pinneberg, Germany |
| --- | --- | --- |
| [21] | Appl. No. | 4,549 |
| [22] | Filed | Jan. 21, 1970 |
| [45] | Patented | Dec. 14, 1971 |
| [73] | Assignee | Fordertechnik Hamburg Harry Lassig<br>Muhlerdamm, Germany |
| [32] | Priority | Dec. 20, 1969 |
| [33] | | Germany |
| [31] | | P 19 63 968.0 |

[54] APPARATUS FOR STACKING AND DESTACKING BARRELS
24 Claims, 7 Drawing Figs.

[52] U.S. Cl. .................................................. 214/6 BA, 214/6 N
[51] Int. Cl. ................................................... B65g 57/30
[50] Field of Search ........................................... 214/6 N, 6.2, 6.5; 53/142–144

[56] References Cited
UNITED STATES PATENTS

| 2,470,795 | 5/1949 | Socke ........................... | 214/6 N X |
| 2,544,735 | 3/1951 | Strickler ....................... | 214/6 N X |

*Primary Examiner*—Gerald M. Forlenza
*Assistant Examiner*—Robert J. Spar
*Attorney*—McGlew and Toren ABSTRACT: A method and an apparatus for stacking and destacking cylindrical as well as bulgy barrels which allow barrels to be stacked in several rows one on top of the other and to remove the rows of barrels one row after the other again. The apparatus includes a support frame with a storage bay for receiving the barrels. The storage bay includes a bottom feed and discharge opening through which several barrels which have been aligned in a row on a conveyor may be introduced into the bay. Means are provided for feeding the barrels to the feed and discharge opening, for aligning the barrels in a predetermined position, for lifting the barrels into the storage bay and for retaining the barrels within the bay.

Inventor:
GERHARD ARNEMANN
McGlew & Toren
ATTORNEYS

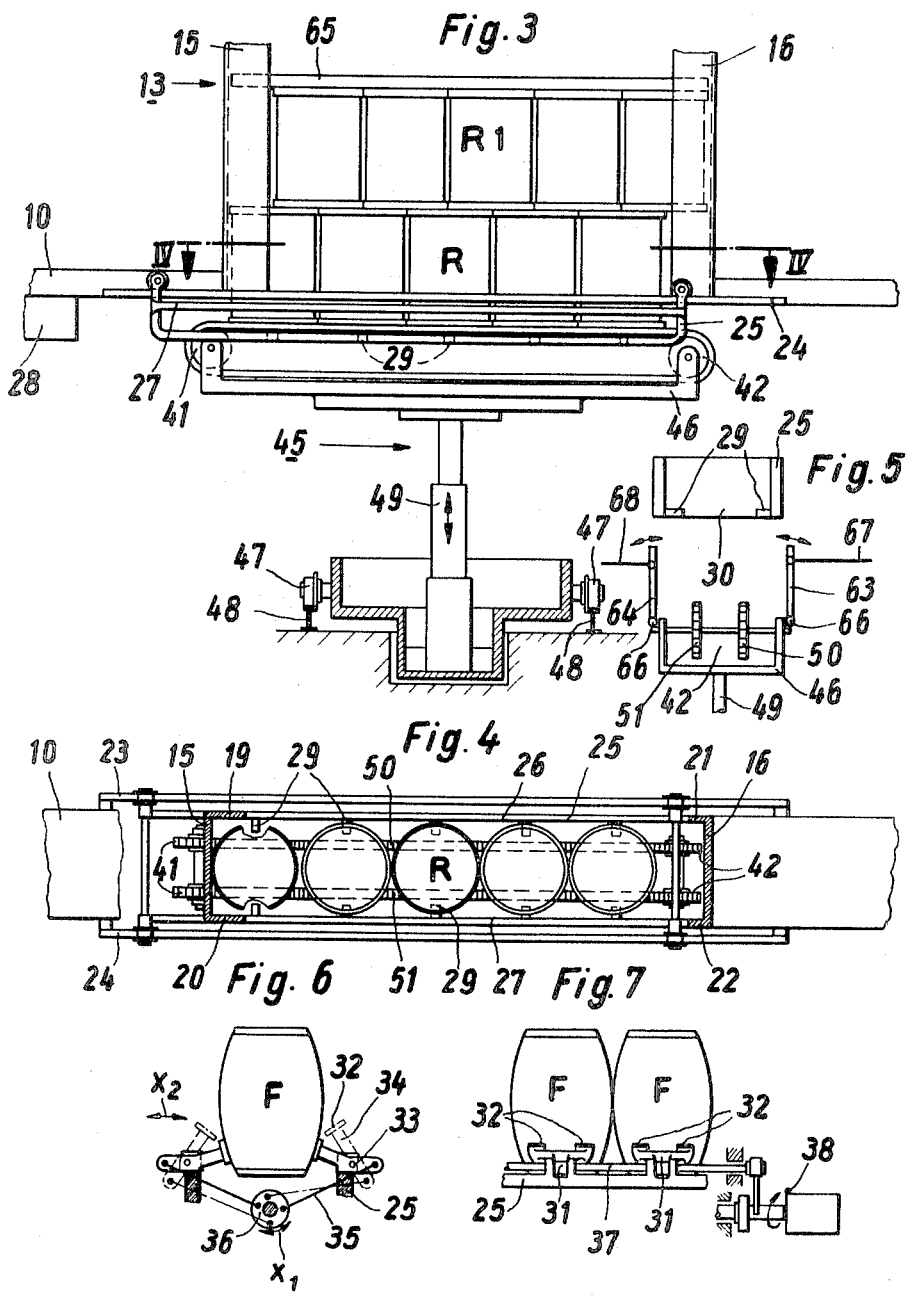

APPARATUS FOR STACKING AND DESTACKING BARRELS

This invention relates to a method of and an apparatus for the stacking and the destacking of barrels.

Empty barrels as well as filled barrels containing various substances such as chemicals, chemical base products, paints, lacquers or any other products require considerable storage space, especially since in most instances it is not possible to stack the barrels in several layers one upon the other so that the storage of these barrels requires relatively large areas. For the stacking of barrels resting on pallets suitable forklift-type conveyors are required, the lifting height of which is restricted. Moreover, if the barrels are stacked on pallets, these pallets cannot be utilized for any other stacking goods. Therefore a large supply of pallets is required, and these pallets themselves require a considerable storage space.

Accordingly, it is a principal object of the present invention to provide an improved method of stacking and destacking cylindrical as well as bulgy barrels, drums and the like.

An additional object of this invention is to provide a method of stacking and destacking barrels which allows to readily and economically stack barrels in several rows one on top of the other within a minimum space or in a minimum storage area respectively.

A further object of this invention is to provide an apparatus for the stacking and the destacking of barrels.

For achieving the above objects, the invention proposes a method of stacking and destacking barrels according to which method the barrels are grouped into several rows, the individual rows of barrels are displaced by a distance corresponding to half a barrel diameter towards the one side or towards the other side, then the rows of barrels are lifted into the bottom opening of a storage bay, at the same time maintaining the lowermost row of barrels together with the rows of barrels supported on top of this lowermost row in a raised position by means of holding members provided in the zone of the feed opening of the storage bay, and that for destacking the barrels the holding members are released from engagement with the barrels of the lowermost row of barrels and the lowermost row of barrels together with the rows of barrels supported on top of the lowermost row of barrels are lowered by a distance corresponding to the height of one row of barrels and the lowermost row of barrels is led off while, at the same time, the next now lowermost row of barrels is engaged by the holding members.

According to a further feature of the present invention the apparatus for stacking and destacking barrels comprises a horizontal support frame having support legs and carrying a storage bay with a bottom feed and discharge opening for receiving barrels which have been aligned in a row, the width of the storage bay corresponding to the maximum diameter of the barrels, a carriage below the feed and discharge opening of the storage bay, the carriage movable in a direction parallel to the feed and discharge opening and including a rectangular frame of a width corresponding to the maximum diameter of the barrels, the frame including longitudinal beam members carrying holding members at the inner surfaces of the beam members, the holding members adapted to support the barrels and arranged side by side along the longitudinal beam members of the carriage frame whereby the spacing of the holding members corresponds to the maximum diameter of the barrels, and the holding members on the opposing beam members mutually face each other, a rotatable conveyor means below the support frame with the carriage and the feed and discharge opening of the storage bay, the conveyor means adapted to rotate in a direction parallel to the direction of movement of the carriage and adapted to align the barrels in a row, an abutment mounted on the discharge side of and above the conveyor means in the feeding path of the barrels, the abutment adapted to limit the length of a row of barrels and being movable by half a barrel diameter either towards the infeed side or towards the discharge side of the conveyor means whereby the direction of movement of the abutment is reversible by control means upon engagement of the abutment with the foremost barrel of a row of barrels fed in by the conveyor means, the conveyor means mounted on a lifting platform and adapted to be raised past the holding members of the carriage into a position adjacent to the holding members, the lifting platform including lifting means operatively coupled by a control means to a drive means for the carriage and coupled to the holding members so that the carriage is adapted to be displaced by half the largest barrel diameter into a position corresponding to the displaced position of the lowermost row of barrels on the conveyor with respect to the row of barrels supported overhead of this row when the holding members have been disengaged from the row of barrels supported above the row of barrels standing on the conveyor means and when the row of barrels disposed on the conveyor has been lifted up into the vicinity of the holding members.

The guiding and storage bay for the rows of barrels includes two mutually spaced lateral boundary walls mounted on the support frame, the boundary walls being of U-shaped cross section the open sides of the walls opposing each other and each of the walls including flanges the spacing of which corresponds to the largest diameter of the barrels so that portions of the outermost barrels of each individual row of barrels displaced with respect to the other rows of barrels are guided within the lateral boundary walls and each row of barrels is guided on one side by the lateral boundary walls. The mutual spacing of the two lateral boundary walls corresponds to approximately the distance of a multiple of the diameter of a barrel and half the diameter of a barrel.

The barrels of the lowermost row of barrels of the several rows of barrels stacked one on top of the other are held in the carriage either by means of retaining or holding cams projecting into the lifting path of the rows of barrels or by means of clamping jaws which may be applied to the outer wall of the barrels whereas in the first-mentioned embodiment the retaining cams the barrels are supported by the cams. The retaining cams are mounted on the inner surfaces of the longitudinal beams of the carriage frame whereby the retaining cams on both sides of the beams are arranged in mutually opposing relationship. The spacing of the retaining cams on each of the longitudinal side beams corresponds to the largest diameter of a barrel. For feeding the barrels together with the carriage including the retaining cams towards the storage bay the conveyor means comprises two endless chain belts the spacing of which corresponds approximately to half the barrel diameter so that the chain belts may be lifted up beyond the plane defined by the rows of retaining cams when the conveyor means is raised above the plane defined by the retaining cams.

According to a further feature of the present invention, several support frames containing a storage bay each are mounted one behind the other whereby the lateral boundary walls of all of the support frames form continuous sidewalls. The foremost and the last support frame are closed by vertical wall plates. An upper cover plate connecting the free upper ends of the lateral boundary walls forms an upper closure of the apparatus. On the ground below the several storage bays are provided guide rails for the movable lifting platform and the conveyor allowing to move the conveyor into positions below each of the storage bays. On the infeed and discharge sides of the conveyor are provided feed and leadoff conveyors extending along the whole length of the apparatus allowing to transfer barrels to the conveyor and to remove barrels from the conveyor in any position desired. In this manner, barrels may be supplied to or removed from any of the storage bays.

By means of the apparatus of the invention barrels may be stacked on a minimum area. The height of the storage bay may be suitably selected, and the lifting capacity of the lifting platform with the conveyor means supported thereby must be designed accordingly because every row of barrels which is fed into the storage bay is at first lifted so far until it engages the lowermost row of barrels of the rows already stacked inside the storage bay which lowermost row of barrels is supported by the carriage. Then the row of barrels fed into the storage bay is lifted further, thereby raising all of the rows of barrels supported overhead, until the barrel heads of the barrels standing on the conveyor have reached an elevation above the retaining cams on the carriage so that the carriage may be moved sideways by half a barrel diameter. Since moreover the individual rows of barrels are mutually displaced by half a barrel diameter a compound is formed allowing secure stacking even up to considerable heights. In the lateral boundary walls of the storage bay the individual rows are guided and held alternately in the one or in the other boundary wall. The rigidity of the barrel compound within the storage bay may be further enhanced by a pressure plate lying on top of the uppermost row of barrels. Cylindrical as well as bulgy barrels may be stacked with the same ease and with the same good results. The destacking may be as readily effected as the stacking of barrels. Since several support frames arranged one behind the other and containing a storage bay each form an enclosure which is protected against outside influences such as rain, wind and the like, the stacking apparatus do not need to be installed within specialized buildings or in confined spaces. The novel stacking apparatus may therefore be installed in outdoor locations. The stacking apparatus may be manufactured at low cost and may be installed practically anywhere, making an economical storage of barrels feasible.

An embodiment of the apparatus for stacking and destacking according to the present invention will be described in conjunction with the drawing in which:

FIG. 1 is a front elevational view of a stacking and destacking apparatus constructed in accordance with the present invention, the apparatus comprising a support frame with a storage bay for the individual rows of barrels and a carriage having holding members for supporting the barrels in the zone of the feed and discharge opening of the storage bay, and a bottom conveyor means adapted to be raised or lowered;

FIG. 3 is a lateral elevational view of the conveyor means adapted to be raised and lowered, in a raised position;

FIG. 4 is a horizontal sectional view taken along a line IV—IV of FIG. 3;

FIG. 5 is a lateral elevational view of the conveyor means adapted to be raised and lowered, and including foldable lateral guiding walls for aligning the barrels on the conveyor, and FIGS. 6 and 7 are a lateral elevational view and a front elevational view respectively of a further embodiment of the holder means on the carriage.

Figure 1:
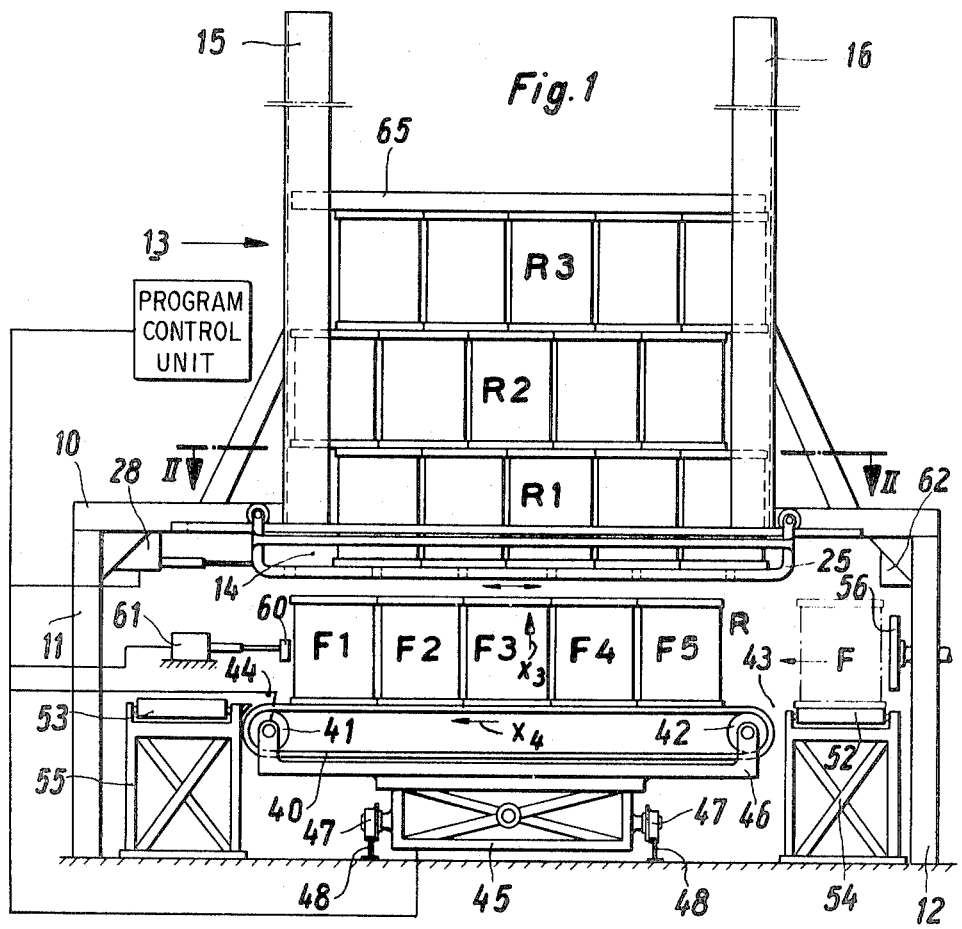
Figure 2:
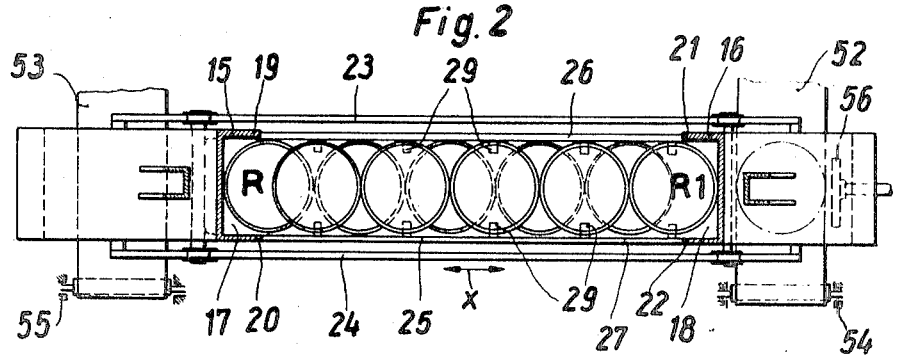
FIG. 2 is a vertical sectional view taken along a line II—II of FIG. 1.

Referring to the preferred embodiment of the invention illustrated in FIGS. 1 and 2 of the drawing the reference 10 designates a horizontal support frame having support legs 11, 12 and providing a storage bay 13 with a bottom feed and discharge opening 14. The feed and discharge opening 14 is designed to receive several barrels F arranged in a row. The storage bay 13 comprises two mutually spaced lateral boundary walls 15, 16 of U-type cross section, the open sides 17, 18 of the "U's" mutually facing each other. The width of the feed and discharge opening 14 corresponds to the maximum barrel diameter whereas the length of the opening is determined by the spacing of the two boundary walls 15, 16. The mutual spacing of the flanges 19, 20 and 21, 22 of the these boundary walls 15, 15 corresponds to the maximum diameter of the barrels so that the barrels may be guided by these boundary walls 15, 16. The mutual spacing of the two boundary walls 15, 16 the height of which may be freely selected corresponds approximately to a distance of a multiple of the diameter of a barrel and a half of the diameter of a barrel. In the embodiment shown in FIG. 1 the spacing of the two boundary walls 15, 16 amounts to the length of a row of five cylindrical barrels placed side by side and half a barrel, i.e. the length of five and a half barrel diameters. The spacing of the two boundary walls 15, 16 may also be larger or smaller, in any case however, it must correspond to a multiple of the barrel diameter plus half a barrel diameter. The storage bay 13 may also be closed on all sides and include an upper cover plate, i.e. consist of a boxlike casing provided with the bottom feed and discharge opening 14. In the latter case, the boxlike casing serves to protect the stacked barrels against atmospheric conditions.

Guide rails 23, 24 are disposed alongside the storage bay at the longitudinal beams on either side of the support frame 10. These guide rails serve to guide a carriage 25 movably mounted on these rails and comprising a rectangular frame with longitudinal side beams 26, 27. The carriage 25 is movable in increments corresponding to half a barrel diameter by means of a drive means indicated at 28 such as a hydraulic pressure cylinder, below the bottom feed and discharge opening 14 of the storage bay 13, in the direction of the arrow $x$ either in a direction towards the boundary wall 15 or in a direction towards the boundary wall 16. The longitudinal beams 26, 27 of the carriage frame 25 are provided at their inwardly facing surfaces with retaining or holding cams 29 serving to support the barrels of a row which are carried by the carriage 25 by means of the retaining cams 29. The drive movement of the carriage 25 may also be effected by a mechanical or an electrical drive means.

The retaining cams 29 of the carriage 25 are provided on the longitudinal carriage beams 26, 27 in such a manner that the retaining cams project into the lifting path of a row of barrels to be fed into the machine. The mutual spacing of the retaining cams 29 on each of the longitudinal beams 26 or 27 corresponds to the maximum barrel diameter. The retaining cams 29 on the two longitudinal beams 26, 27 of the carriage 25 oppose each other, and the length of the retaining cams 29 is so designed that the retaining cams grip from below the outer portions of the barrel heads. The clearance between the two base lines defined by the free ends of the retaining cams 29 is indicated at 30 (see (FIG. 5).

Instead of the retaining cams 29 at the carriage 25 other types of support members for the barrels may also be employed. At the inner sides of the longitudinal beams 26, 27 of the carriage 25 clamping jaws 31 as shown in FIGS. 6 and 7 of the drawing may be used, the clamping jaws 31 comprising bearing plates 32 attached to the free ends of two-armed levers 34 which are rotatably mounted in their center portions at 33. The free lever ends remote from the bearing plates 32 are coupled by guiding rods 35 to a drive disk 36 operated by a motor not shown in the drawing. The whole arrangement is such that upon suitable actuation of the drive disk 36 as indicated by the arrow $x_1$ in FIG. 6 the clamping jaws 31 will be brought into engagement with or disengaged from the outer surface of a barrel, such as indicated by the arrow $x_2$. If the clamping jaws 31 have been moved into an engagement with the barrels, the contact pressure will be maintained by the drive motor for the drive disks 36 until releasing of the jaws 31 is desired. The jaws 31 arranged on either of the longitudinal beams 26, 27 of the carriage 25 are simultaneously brought into engagement with the two sides of the barrel and are also simultaneously disengaged from the same. In the embodiment shown in FIG. 7 the clamping jaws 31 have the form of two bearing plates 32 side by side, coupled mutually in pairs and rotatively mounted on the frame of the carriage 25. The mutually facing bearing plates of two adjacent clamping jaws 31 are connected by means of drive rods 37 which are coupled to a drive means indicated at 38 adapted to convey swiveling movements to the clamping jaws 31. The clamping jaws 31 may be arranged so as to engage the barrels in the center of the barrel heads or also above the barrel heads. To assure secure holding of the barrels, the bearing plates 32 of the clamping jaws 31 may be of an arcuate shape which conforms to the outer profile of the barrels. Additionally, the clamping jaws 31 may be provided at their bearing surfaces with suction cups connected by a flexible hose means to a vacuum source. In this way, the support of the barrels may be substantially improved when the clamping jaws 31 are engaged.

Below the storage bay 13 a circular-type conveyor is arranged, the conveyor 40 being movable in elevation in the direction of the arrow $x_3$. If the support means provided on the carriage 25 are in the form of clamping jaws 31, the conveyor 40 does not need to be lifted beyond the horizontal plane defined by the carriage so that the conveyor belt 40 may be provided in the form of an endless belt guided by return rollers 41, 42. One of these return rollers 41, 42 serves as a drive roller. The direction of rotation of the belt 40 is indicated by the arrow $x_4$ (FIG. 1). The direction of the discharge side of the conveyor beht 40 is indicated at 43, and the infeed side at 44. Lifting and lowering the conveyor belt 40 is effected by means of a bottom lifting platform 45 on which is mounted the frame 46 of the conveyor belt 40. The lifting platform 45 may be arranged stationary or movable below the support frame 10. The latter arrangement will always be used if several support frames in the form of units 10 having storage bays 13 are assembled one behind the other, allowing to move the conveyor belt 40 to any of the storage bays 13. Towards this purpose, the lifting platform 45 is provided with rollers 47 running on rails 48 which are arranged transversely to the feed direction of the conveyor. The drive means for lifting and lowering the lifting platform 45 may be hydraulically actuated pressure cylinders 49 (FIG. 3) or any other suitable drive means.

According to a further embodiment of the invention the conveyor 40 may consist of two endless rotating chain belts 50, 51 the spacing of which is smaller than the clearance 30 between the retaining cams 29, allowing to lift the conveyor belt 40 beyond the plane defined by the retaining cams 29.

In its initial position, i.e. in its lowermost position the conveyor 40 is flanked by a feed conveyor 52 and a leadoff conveyor 53 which conveyors are supported by stationary frames 54 and 55 respectively and serve to feed barrels to the conveyor belt 40 or remove barrels from the conveyor belt 40 respectively. The feed conveyor 52 and the leadoff conveyor 53 preferably have the form of roller trains or roller conveyors which are arranged at right angles to the transport conveyor 40. The lengths of the feed and leadoff conveyors 52, 53 correspond at least to the length of an apparatus for stacking and destacking comprising several support frames 10 with storage bays 13. The two conveyors 52, 53 are arranged parallel to each other. The transfer of barrels from the feed conveyor 52 is carried out by means of a hydraulically actuated slider 56 which is arranged on one side of the transfer area of the barrels (FIG. 1). If several apparatus for stacking and destacking are arranged in tandem, every apparatus may be provided with a transfer slider 56 allowing to alternately supply each of the apparatus with barrels.

In the feeding path of the barrels on the conveyor belt 40 is provided a horizontally adjustable abutment 60 limiting the length of a row of barrels and adjustable in increments corresponding to half a barrel diameter by means of a drive means indicated at 61 towards the feed side or towards the discharge side of the conveyor belt 40. When the abutment 60 is engaged by the first barrel of a row of barrels being fed into the apparatus, the direction of travel of the abutment 60 is reversed by a control contact if a new row of barrels is fed onto the conveyor 40. In the area of transfer of the barrels from the feed conveyor 52 towards the conveyor 40 is provided a counting device 62 which may have the form of a light barrier or of a means actuated by sensors. As soon as a predetermined number of barrels, which are to be lined up on the conveyor 40 has been reached, to which the counting device had been previously set the further supply of barrels is stopped. If the barrels are lined up on the conveyor 40 without leaving any clearances between the barrels, the conveyor 40 is stopped and then lifted by the lifting platform 45. The abutment 60 is not adjusted by the distance of half a barrel diameter until the next supply of barrels is fed in so that the row of barrels is displaced by half the diameter of a barrel against the next row of barrels, as may be seen in FIG. 1. It is not necessary to stop the movement of the conveyor 40, and the conveyor may continue to rotate. For keeping the barrels aligned in a row, vertical guiding walls 63, 64 are arranged on either side of the conveyor 40, the spacing of which is adjustable (FIG. 5).

In order to allow stacking of the barrels on top of each other notwithstanding the compound stacking of the barrels and without reducing the stability of the stack, there is provided a pressure plate 65 which is guided in the lateral boundary walls 15, 16 of the storage bay 13 whereby the free ends of the pressure plate 65 are guided by the profile openings 17, 18 of the U-shaped boundary walls 15, 16 (FIGS. 1 and 3).

The operation of the apparatus of the present invention may be briefly described as follows: For stacking, barrels F are fed by the feed conveyor 52 onto the conveyor 40 and, as shown in the embodiment of FIGS. 1 and 2, five barrels F1, F2, F3, F4 and F5 are assembled in a row R. For this example it will be assumed that the storage bay 13 already holds three rows of barrels, the rows R1, R2 and R3. The individual rows R1, R2, R3 are mutually displaced against each other by half a barrel diameter so that the halves of the outermost barrels of the rows R1 and R3 are guided in the boundary wall 16 whereas the outermost barrel in row R2 is guided by the boundary wall 15. The barrels of the row R1 are held by the carriage 25, supporting thereby all of the other rows R2, R3 stacked on top of the row R1. The barrels of the row R1 are thereby supported by the retaining cams 29 of the carriage 25 as may be seen also is FIG. 2.

Since the row of barrels R1 is displaced towards the boundary wall 16, the following row R supported on the conveyor 40 must be displaced to the other side. Therefore the abutment 60 has been moved into its extreme left-hand position. Then the row R is lifted by the lifting platform 45 so far at first until the barrels of the row R engage the heads of the barrels of row R1. Since the row R is displaced by half a barrel diameter with respect to the row of barrels R1, the row R may be lifted by a further upward movement of the lifting platform 45 because the retaining cams 29 of the carriage 25 are now disposed in the front and back interspaces formed between any two adjacent barrels. In this way, the row of barrels R may be lifted upwardly past the retaining cams 29 (FIG. 2).

The lifting movement of the lifting platform 45 is then continued: The whole stack, i.e. all rows of barrels R, R1, R2, R3 are lifted, thereby raising simultaneously the barrels of the row R1 from the retaining cams 29 by which these barrels were supported. This lifting movement is not completed until the heads of the barrels of the row R have been lifted above the retaining cams 29 of the carriage 25. In this position, however, the barrels of the row R may not yet be supported on the retaining cams 29. In this position of the row R above the retaining cams 29 the carriage 25 is pushed by the apparatus mechanically towards the left, i.e. towards the boundary wall 15 for a distance corresponding to half a barrel diameter. By this movement the retaining cams 29 are brought into a position below the heads of the barrels in the row R. Since the conveyor 40 is arranged in such a manner that the conveyor may be lifted past the retaining cams 29, it is possible to raise the row R above the retaining cams 29. The row R is at that point still supported by the conveyor 40. Subsequently the lifting platform 45 together with the conveyor 40 is lowered, bringing the barrels of the row R to rest on the retaining cams 29. The storage bay 13 then accommodates four rows of barrels which rows are all supported within the storage bay by the carriage 25 and the retaining cams thereof. As soon as the lifting platform 45 with the conveyor 40 has reached its lower end position the abutment 60 is displaced towards the right by half a barrel diameter. Then the conveyor 40 is again energized unless it is operating continuously, and other barrels are supplied and aligned in a row which is then transported into the storage bay 13 in the manner previously described.

The destacking of the barrels is carried out in the reverse mode of operation. The conveyor 40 is raised upwardly until it engages the heads of the barrels supported by the retaining cams 29 of the carriage 25. By a continued upward movement of the conveyor 40 the barrels of the lowermost row are lifted off the retaining cams 29, then the carriage 25 is moved towards the left side or towards the right side, depending upon the direction into which the row has been displaced. In any case, the carriage 25 must be moved sideways so far until the retaining cams 29 are no longer in alignment with the heads of the row of barrels which is intended to be removed but are aligned with the heads of the barrels in the row on top of this lowermost row.

Then the conveyor 40 is lowered, lowering thereby the whole stack of barrels contained in the storage bay 13. As soon as the corresponding row of barrels comes into engagement with the retaining cams 29 all rows of barrels which are positioned on top of this lowermost row come to a rest and are held in the storage bay 13, whereas the lowermost row supported by the conveyor 40 is lowered into the lower end position of the lifting platform 45 and the barrels are led off over the roller conveyor 53.

The lifting means of the lifting platform 45 with the conveyor 40 and the drive means 28 of the carriage 25 are operatively coupled by control means not shown in the drawing. This control means allows to perform an operational sequence in which the carriage 25 will be shifted by half the maximum barrel diameter into a position corresponding to the displaced position of the row of barrels on the conveyor 40 with respect to the row of barrels held above this row when the retaining members have been released from the row of barrels held by the carriage 25 or when these barrels have been lifted off the retaining cams or retaining members. The drive means of the conveyor 40 may be coupled to a cycle control device serving to gradually feed the barrels into a row. The alignment of the barrels on the conveyor 40 is effected by the guiding walls 63, 64 which are arranged on either side of the conveyor 40. The lower longitudinal edges of these guiding walls are movably connected at 66 to the frame 46 of the conveyor 40 and may be moved into a vertical position by power-driven control rods 67, 68. When the conveyor 40 is moved past the retaining cams 29 of the carriage 25 the guiding walls 63, 64 are folded down (FIG. 5). The individual drive means for the sequential operation of conveyor 40, lifting platform 45, carriage 25 and abutment 60 are coupled to a program control unit and may be actuated by this unit. It is likewise possible to arrange the control means in a control panel to also allow manual control of operation.

What is claimed is:

1. An apparatus for practising the method of stacking and destacking barrels characterized in that said apparatus comprises a horizontal support frame having support legs and carrying a storage bay with a bottom feed and discharge opening for receiving barrels which have been aligned in a row, the width of said storage bay corresponding to the maximum diameter of the barrels, a carriage below said feed and discharge opening of said storage bay, said carriage movable in direction parallel to said feed and discharge opening and including a rectangular frame of a width corresponding to the maximum diameter of said barrels, said rectangular frame including longitudinal beam members carrying holding members at the inner surface of said beam members, said holding members adapted to support said barrels and arranged side by side along said longitudinal beam members of said rectangular carriage frame whereby the space between opposing holding members is less than the maximum diameter of said barrels, and the holding members on said opposing beam members mutually face each other, a rotatable conveyor means below said support frame with said carriage and said feed and discharge opening of said storage bay, said conveyor means adapted to rotate in a direction parallel to the direction of movement of said carriage and to align the barrels in a row, an abutment mounted on the discharge side of and above said conveyor means in the feeding path of said barrels, said abutment adapted to limit the length of a row of barrels and being movable by half a barrel diameter either towards the infeed side or towards the discharge side of said conveyor, whereby the direction of movement of said abutment is reversible by control means upon engagement of said abutment with the foremost barrel of a row of barrels fed in by said conveyor, said conveyor means mounted on a lifting platform and adapted to be raised past said holding members of said carriage into a position adjacent to said holding members, said lifting platform including lifting means operatively coupled by a control means to a drive means for said carriage with said holding members so that said carriage is adapted to be displaced by half the largest barrel diameter into a position corresponding to the displaced position of the lowermost row of barrels on said conveyor with respect to the row of barrels supported overhead of said row when the holding members have been disengaged from said row of barrels supported above said row of barrels standing on said conveyor means and when said row of barrels disposed on said conveyor has been lifted up into the vicinity of said holding members.

2. An apparatus as defined in claim 1, wherein said storage bay for said rows of barrels includes two mutually spaced lateral boundary walls mounted on said support frame, said boundary walls being of U-shaped cross section the open sides of said walls opposing each other and each of said walls including flanges the spacing of which corresponds to the largest diameter of said barrels.

3. An apparatus as defined in claim 2, wherein the mutual spacing of said two lateral boundary walls corresponds to approximately the distance of a multiple of the diameter of a barrel and half the diameter of a barrel.

4. An apparatus as defined in claim 2, wherein guide rails for guiding said carriage are provided on both sides of said lateral boundary walls of such support frame, said carriage is coupled to a drive means for displacing said carriage.

5. An apparatus as defined in claim 1, wherein said holding members for said barrels of said lowermost row of barrels disposed within said storage bay comprise horizontal retaining cams on said carriage said cams projecting from said carriage into the lifting path of said rows of barrels to be supplied to said storage bay, the lengths of said cams being selected so that said cams may engage the outer portions of the heads of said barrels in leaving a clearance between said cams, said conveyor means including two chain belts adapted to rotate parallel to each other, the spacing of said chain belts being smaller than the clearance between the retaining cams of the opposing rows of retaining cams, said chain belts adapted to be lifted beyond a plane defined by said retaining cams.

6. An apparatus as defined in claim 5, wherein the spacing of said retaining cams on each longitudinal side beam member of said carriage corresponds to the largest diameter of a barrel, and said retaining cams on said two side beam members of said carriage mutually face each other.

7. An apparatus as defined in claim 1, wherein said holding members on said carriage include clamping jaws with bearing plates adapted to engage said barrels at a point above said lower barrelhead said jaws and plates controllable by means of a power-driven guiding system.

8. An apparatus as defined in claim 7, wherein said clamping jaws are arranged on said carriage and are adapted to engage said barrels on the opposite sides thereof.

9. An apparatus as defined in claim 2, wherein a pressure plate is movably guided in the lateral boundary walls of said storage bay, the free ends of said pressure plate guided by the open sides of the U-shaped lateral boundary walls.

10. An apparatus as defined in claim 1, wherein hydraulic pressure cylinders coupled to control means are provided as drive means for said lifting platform with said conveyor means.

11. An apparatus as defined in claim 1, wherein a feed conveyor is arranged at the infeed side of said conveyor means, said feed conveyor being arranged on a stationary frame.

12. An apparatus as defined in claim 11, wherein a leadoff conveyor is arranged at the discharge side of said conveyor means, said leadoff conveyor being arranged on a stationary frame.

13. An apparatus as defined in claim 12, wherein said feed conveyor and said leadoff conveyor are arranged at right angles to said conveyor means.

14. An apparatus as defined in claim 13, wherein said feed conveyor and said leadoff conveyor are arranged parallel to each other.

15. An apparatus as defined in claim 11, wherein a hydraulically actuable slider adapted to transfer barrels from said feed conveyor to said conveyor means is provided in the transfer area of said barrels.

16. An apparatus as defined in claim 1, wherein a vertical guiding wall is arranged on either side of said conveyor means.

17. An apparatus as defined in claim 16, wherein the mutual spacing of said vertical guiding walls is variable.

18. An apparatus as defined in claim 16, wherein the lower longitudinal edges of said guiding walls on either side of said conveyor means are movably attached to the frame of said conveyor means and are adapted to be moved by power-driven control rods into a vertical position to align the barrels standing on said conveyor means.

19. An apparatus as defined in claim 1, wherein said conveyor means is provided with a drive means coupled to a cycle control device, and said transfer means for said barrels is coupled to a counting device adapted to control the rotation of said conveyor means.

20. An apparatus as defined in claim 1, wherein said lifting platform with said conveyor means is movably arranged on ground guide rails running transversely to the direction of rotation of said conveyor means by means of rollers.

21. An apparatus as defined in claim 20, further characterized by several support frame units mounted one behind the other, each of said frames having a storage bay and a carriage arranged below said storage bay.

22. An apparatus as defined in claim 21, wherein said lateral boundary walls of said storage bay are provided in the form of continuous outer walls, said walls being connected at the upper free ends by a cover plate.

23. An apparatus as defined in claim 21, wherein said boundary walls of said foremost and of said last support frames are connected by vertical wall plates, forming a closed unit including several storage bays each having a bottom feed and discharge opening.

24. An apparatus as defined in claim 1, wherein said drive and control means for the various operational sequences of said conveyor means, said lifting platform, said abutment and said carriage are coupled to a program control unit.

* * * * *